United States Patent [19]

Beaulieu et al.

[11] Patent Number: 5,563,723
[45] Date of Patent: Oct. 8, 1996

[54] METHOD OF CALIBRATION OF IMAGE SCANNER SIGNAL PROCESSING CIRCUITS

[75] Inventors: Dennis N. Beaulieu, Churchville; John T. Compton, LeRoy, both of N.Y.; Eugene R. Wojtanik, Plano, Tex.

[73] Assignee: Eastman Kodak Company, Rochester, N.Y.

[21] Appl. No.: 298,877

[22] Filed: Aug. 31, 1994

[51] Int. Cl.[6] .................................................. H04N 1/40
[52] U.S. Cl. ........................... 358/461; 358/406; 358/446; 358/443; 358/474
[58] Field of Search ...................... 358/406, 446, 358/447, 455, 461, 464, 504, 443, 471, 474; 348/229, 230, 678

[56] References Cited

U.S. PATENT DOCUMENTS

3,800,079  3/1974  McNeil et al. ............................ 178/7.1
4,216,503  8/1980  Wiggins .................................... 358/446
4,660,082  4/1987  Tomohisa et al. ....................... 358/163
5,267,053  11/1993  Potucek et al. ......................... 358/446

*Primary Examiner*—Scott A. Rogers
*Assistant Examiner*—Thomas D. Lee
*Attorney, Agent, or Firm*—Francis H. Boos, Jr.

[57] ABSTRACT

Signal processing circuit for a multi-pixel scanner array is calibrated by establishing gain and offset correction factors from selected scanner signal measurements and known gain/offset settings that provide accurate calibration of the processing circuit on a pixel-by-pixel basis without concern for variations of component and response values within the signal processing circuit itself from nominal values. When used as a film scanner apparatus, measurements of signal responses taken at open gate conditions are compensated by adjusting exposure values for imager operation during film scanning to make the minimum response output of the apparatus for film $D_{min}$ equal to the minimum derived of open gate condition during the calibration process.

11 Claims, 4 Drawing Sheets

METHOD OF CALIBRATION OF IMAGE SCANNER SIGNAL PROCESSING CIRCUITS

FIELD OF THE INVENTION

The invention relates generally to image scanner signal processors, and in particular to a method of calibrating an image scanner signal processor.

BACKGROUND OF THE INVENTION

A charge coupled device (CCD) imager typically employed as an image scanner contains an array of light detecting photosites (hereafter imaging pixels) which accumulate charge depending on the light energy projected onto them. After some charge accumulation time, the charges in the imaging pixels are transferred to a charge shifting structure so that the charges may be shifted out of the CCD and measured by a signal processing circuit in order to form an image signal representative of the image projected onto the CCD. Because of manufacturing variability in the CCD, dust or contaminants in the optical path which projects an image onto the CCD, light source non-uniformity, or other source of variation, the system response for individual imaging pixels may not be the same from pixel to pixel. Compensation for this pixel-to-pixel variation may be provided in the charge measuring process. This compensation can be provided by multiplying the output value for each site by a gain value and then adding an offset value. This pixel-by-pixel application of gain and offset makes the responsiveness of all the sites appear to be equal.

Typically, the system response for a given imaging pixel does not change in the short term. Hence, the gain and offset values required to adjust the system response for a given imaging pixel back to some ideal response can be determined by a calibration process and then applied whenever the signal for that imaging pixel is shifted out of the CCD. A typical calibration process obtains samples of the system response for each imaging pixel at some nominal signal input level (a white, gray, or black card, or full illumination or dark, for example) at some nominal gain and offset values (typically 1 and 0, respectively) and then calculates the required gain and offset values for each of the imaging pixels. However, previously described calibration processes require that the gain and offset mechanisms provide known responses. To the extent that component variations or other factors introduce error, these calibration processes will not be correct. This disclosure describes a calibration process which is insensitive to variations in the gain and offset mechanisms.

Site by site compensation for variations in imaging pixel response is well known in the art. U.S. Pat. No. 3,800,079—McNeil et al describes a system whereby a "sensitivity profile" of all the light detecting sites is created by scanning a "standard background or white level which may be in the form of a document or a bedplate." This profile is converted to digital values and stored in a digital memory for subsequent readout and conversion to an analog compensation signal during an operational mode. The uncompensated video is divided by the analog compensation signal, thereby providing gain correction. Correction for offset variations is also described. This employs storage for a second profile which is obtained by scanning black. This patent lays the foundation for the concept of scanning white to determine gain compensation required, scanning black to determine offset compensation required, and storing these compensation values for readout during an operational mode.

As a typical example, Tomohisa et al. (U.S. Pat. No. 4,660,082) exhibits the shortcomings usually found in the calibration methods for a system employing imaging pixel by imaging pixel application of gain and offset compensation signals. As is usual, this patent describes a system where two sets of reference values are collected, one set by scanning a white reference board and the other set by scanning a black reference board. It is suggested in the patent that "the two density reference voltages are preferably obtained by scanning the corresponding density reference boards with the gain and offset values of the output amplifier at '1' and '0' respectively." However, because of manufacturing tolerances or drift due to temperature variations or aging of components, these desired '1' and '0' levels may be slightly off, leading to error in the resulting compensation values, or requiring an iterative approach to determining the compensation values. In general, the methods described in the prior art all depend on some expectation that some reference values always be set accurately to known levels and/or A/D and D/A conversion mechanisms have known conversion constants and offsets which, in general, is an ideal situation that is virtually impossible to realize in practice. It is desirable, therefore, to provide a method for determining compensation values for gain and offset in an imager signal processing circuit which is insensitive to the internal characteristics of the signal processing chain.

SUMMARY OF THE INVENTION

In accordance with the invention, there is provided a method for calibrating an image scanner signal processing circuit by determining a scanner signal correction factor required to compensate for nonuniformity among imaging pixels of a scanning array. The method comprises the steps of sequentially setting the signal processing circuit at first and second correction factors for all imaging pixels of the scanner array; sequentially scanning first and second reference sources representing high and low scanner output signal values to derive first and second scanner signal samples from the first and second reference sources, respectively, for the first correction factor and to derive third and fourth scanner signal samples from the first and second reference sources, respectively, for the second correction factor. The method further comprises the step of applying a target correction factor to the signal processing circuit for each individual imaging pixel determined from (a) a desired difference between samples obtained for the individual imaging pixel by scanning the first and second reference sources, (b) the first correction factor for the individual imaging pixel, (c) the second correction factor for the individual imaging pixel, and (d) the first through fourth signal samples for the given imaging pixel.

DETAILED DESCRIPTION OF THE INVENTION

Figure 1:
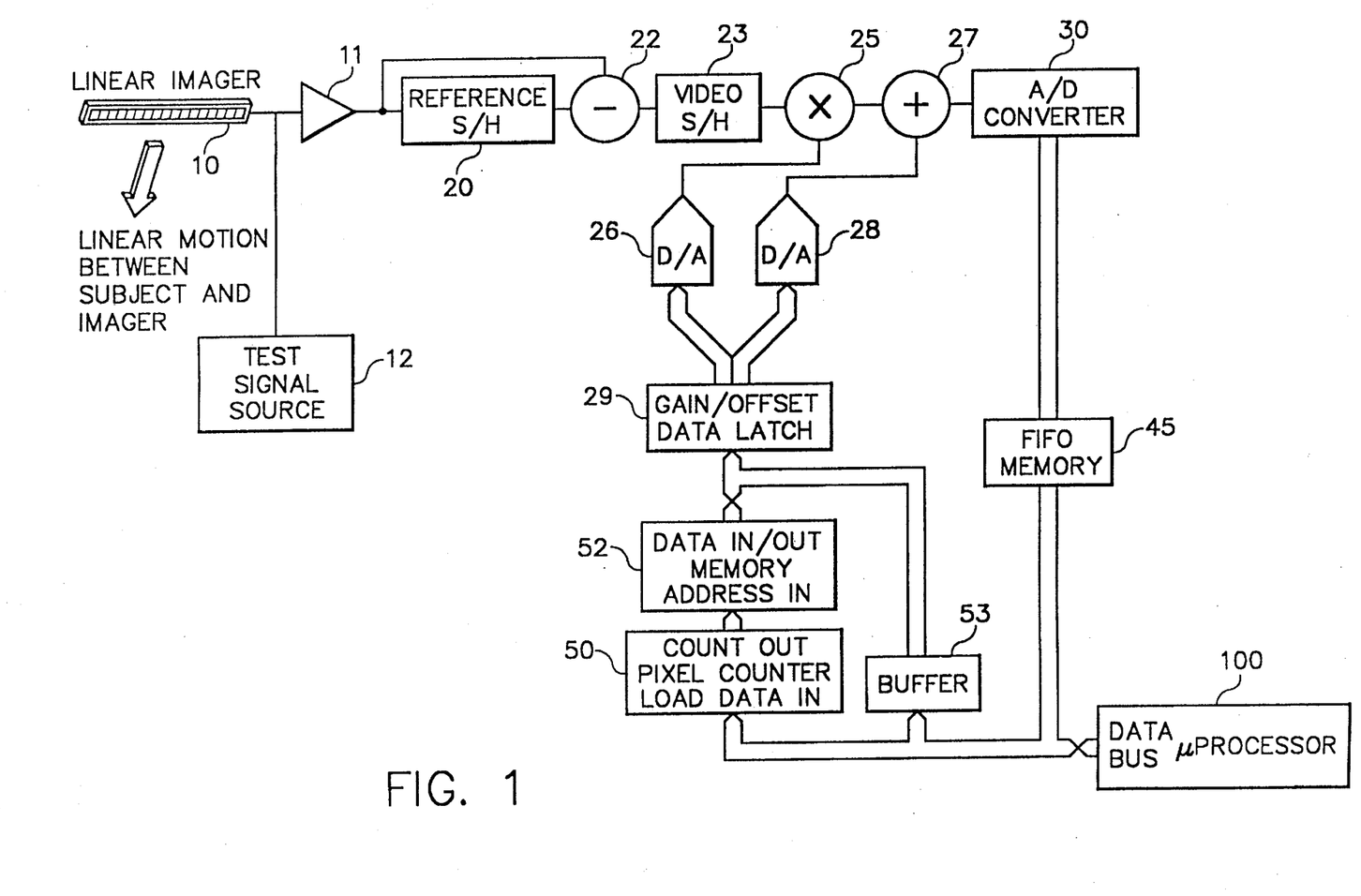
FIG. 1 is a block diagram schematic of signal processing apparatus for a CCD based linear imaging scanner useful in the practice of the present invention.

FIG. 1 shows a typical arrangement of circuit elements in the signal processing circuitry of a CCD-based linear scanner with which the calibration method of the present invention may be suitably practiced. This arrangement employs pixel-by-pixel gain and offset compensation. The linear imager 10 integrates the charges produced by each imaging pixel for a period of time and then transfers the charges to a shifting structure so that the charges can be shifted out of the imager in a serial fashion. The signal produced by the imager for each imaging pixel comprises two phases: a reference phase followed by a video phase. The reference phase provides a reference level against which the following video phase may be compared. The video phase represents the magnitude of charge accumulated by the imaging pixel. The serial signal coming from the linear imager 10 is amplified by amplifier 11, the output of which goes to the subtracter 22 and the reference sample and hold 20. The reference sample and hold samples the signal from the imager during each imaging pixel's reference phase. The subtracter removes the sampled and held reference signal from the subsequent video phase. Hence, the output of the subtracter 22 is normalized to the reference level. This normalized signal is sampled by the video sample and hold 23 during the video phase of the signal provided by the imager. The sampled and held normalized video is operated on by a multiplier 25 and a summer 27. These two circuit elements provide gain and offset compensation for variations in imaging pixel sensitivity, nonuniformity of illumination, variations in signal offset, and so on. The digital to analog converter 26 provides the gain correction value for multiplier 25 and the digital to analog converter 28 provides the offset correction value for summer 27. Data words are provided to the two digital to analog converters upon the arrival of the normalized video signal for each imaging pixel by the pixel counter 50, the memory 52, and the gain/offset data latch 29. The counter increments synchronously with the readout of the imaging pixel signals from the imager. The output of the counter is used to provide an address to the memory which holds gain and offset values for each imaging pixel. The gain and offset data output from the memory is latched by the gain/offset data latch which provides the data to the digital to analog converters. The buffer 53 allows the microprocessor 100 to gain access to the memory 52 in order to change the gain and offset values as the result of some calibration process. During a time when its counting is disabled, the pixel counter may be loaded with a value from the microprocessor in order to provide an address to the memory to which the microprocessor can write. The analog to digital converter 30 converts the normalized, gain and offset corrected video signal to a numeric value which is then written to the FIFO memory 45 for readout by the microprocessor.

Figure 2:
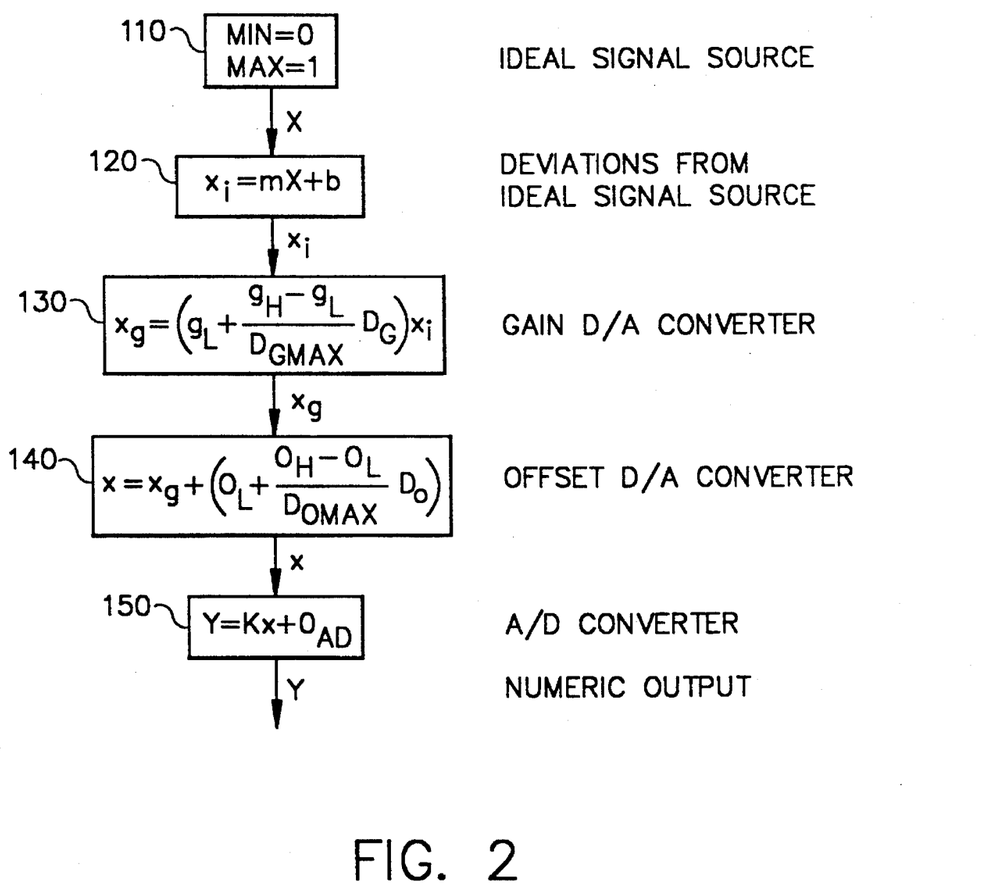
FIG. 2 is a functional flow diagram delineating the operative functions of the principal processing elements of the FIG. 1 apparatus.

FIG. 2 shows the same signal processing chain (up through the A/D converter 30) in functional block diagram form, showing the transfer function for each block which is useful in explaining the underlying concept of the present invention. As shown in this functional block diagram, the scanner signal generated in imager 10 begins in block 110 as some ideal signal with 0 representing the minimum signal level and 1 representing the maximum signal level. The ideal signal source is adversely affected by deviations from the ideal caused by such things as light source nonuniformity, manufacturing variations, etc. resulting in a non-ideal scanner signal from imager 10 being input into the ensuing signal processing apparatus of units through 30. The deviations are represented in block as gain and offset modifications of the ideal signal, the gain and offset varying from pixel-to-pixel in the CCD according to the expression:

$$x_i = mX + b \qquad [1]$$

where:

X=ideal signal source, $x_i$=input signal to correcting circuitry (including deviations from ideal), m=gain deviations from ideal (varying from site to site in the CCD), and b=offset deviation from ideal (varying from site to site in the CCD).

The deviations in gain and offset in the scanner signal are compensated for in the multiplier 25 and summer 27 by application of gain and offset correction values which are the digital values applied to the D/A converters 26 and 28, respectively. First, a digital gain correction value is applied in multiplier 25 to the non-ideal scanner signal as represented by the expression in block 130:

$$X_g = \left( g_L + \frac{g_H - g_L}{D_{G\,max}} D_G \right) x_i \qquad [2]$$

where:

$x_i$=non-ideal signal to be corrected, $x_g$=gain corrected signal, $g_L$=minimum gain, $g_H$=maximum gain, $D_G$=digital input to the gain D/A converter 26, and $D_{Gmax}$=maximum digital input to the gain D/A converter 26.

Then, a digital offset correction value is applied to the gain-corrected signal in summer 27 as represented by the expression in block 140:

$$x = x_g + \left( O_L + \frac{O_H - O_L}{D_{O\,max}} D_O \right) \qquad [3]$$

where:

$x_g$=gain corrected signal, x=fully corrected signal, $o_L$=minimum offset, $o_H$=maximum offset, $D_O$=digital input to the offset D/A converter, and $D_{Omax}$=maximum digital input to the offset D/A converter.

Finally, the fully corrected signal is converted to a digital value by A/D converter 30 as represented in block 150 by the expression:

$$Y = Kx + O_{AD} \qquad [4]$$

where:

Y=A/D converter numerical output (counts),

K=A/D converter output counts per input volts, and $O_{AD}$=fixed numerical offset of A/D converter.

The A/D offset term accounts for offset between the numerical output of the A/D converter and the input. For example, if a −2.5 V input to the A/D converter results in a numerical output of 0 and 2.5 V input to the A/D converter results in a numerical output of 4095, then the value of the offset is 2048.

There will now be described how, in accordance with the method of the invention, calibration of the signal processing apparatus, and in particular the setting of the gain and offset correction values to the inputs of D/A converters 26 and 28, respectively, can be established for pixel-by-pixel compensation of the scanner signal without regard to concern for deviating factors introduced by the compensating circuits themselves.

Putting all these terms together yields an expression for the complete system response, i.e. the digital output value Y from A/D converter 30 from the ideal input signal as follows:

$$Y = \left[ \left( g_L + \frac{g_H - g_L}{255} D_G \right)(mX + b) + \left( o_L + \frac{o_H - o_L}{255} D_O \right) \right] K + O_{AD} \quad [5]$$

Carrying out the multiplications in the last expression yields:

$$Y = \left( Kmg_L + \frac{Kmg_H - Kmg_L}{D_{G\,max}} D_G \right) X + \left( Ko_L + \frac{Ko_H - Ko_L}{D_{o\,max}} D_O \right) + \left( Kg_L + \frac{Kg_H - Kg_L}{D_{G\,max}} D_G \right) b + O_{AD} \quad [6]$$

Let:

$$O_{GI} = \left( Kg_L + \frac{Kg_H - Kg_L}{D_{G\,max}} D_G \right) b = \text{gain induced offset,}$$

$G_L = Kmg_L$
$G_H = Kmg_H$
$O_L = Ko_L$
$O_H = Ko_H$

Further, let $$G_R = \frac{G_H - G_L}{D_{Gmax}} \text{ and } O_R = \frac{O_H - O_L}{D_{o\,max}}.$$

Substituting gives:

$$Y = (G_L + G_R D_G)X + (O_L + O_R D_O) + O_{GI} + O_{AD} \quad [7]$$

Note that m and b vary from imaging pixel to imaging pixel. It will be evident shortly that the terms involving these factors are eliminated in this calibration process.

Figure 3:
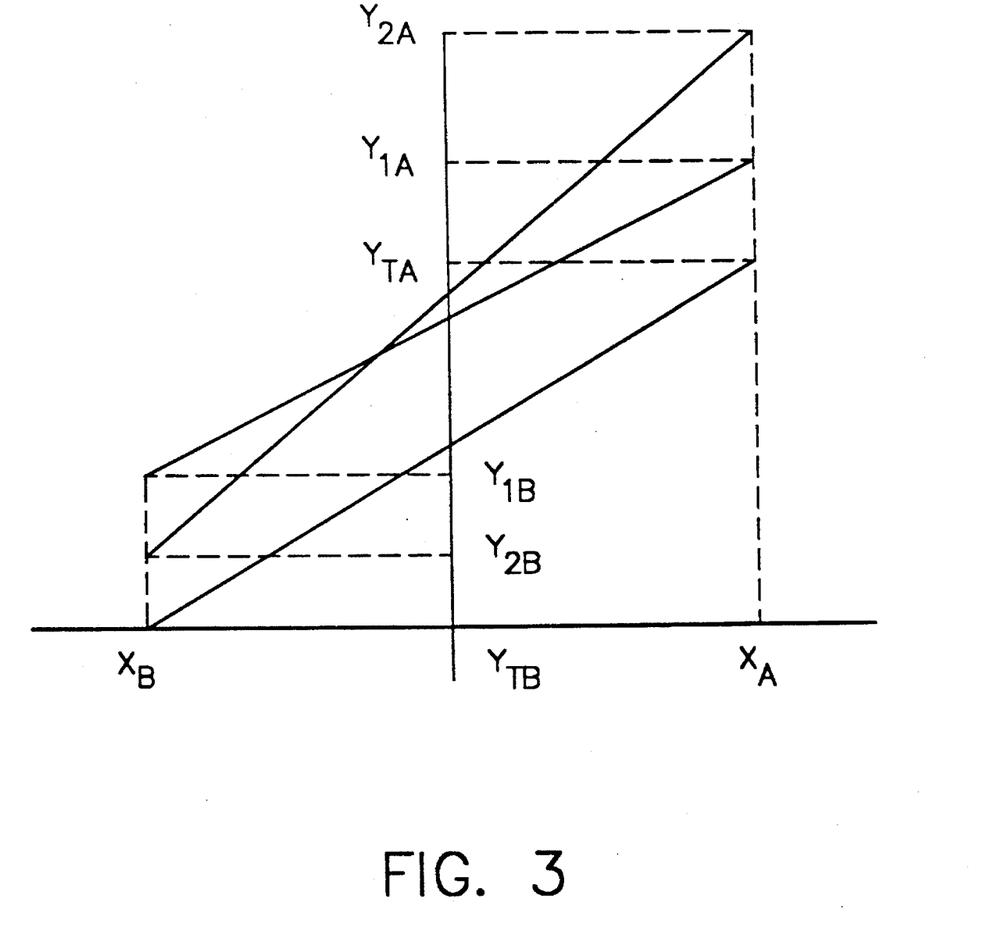
FIG. 3 is a graph of system response for the apparatus of FIG. 1 showing responses for different gain correction settings.
Figure 4:
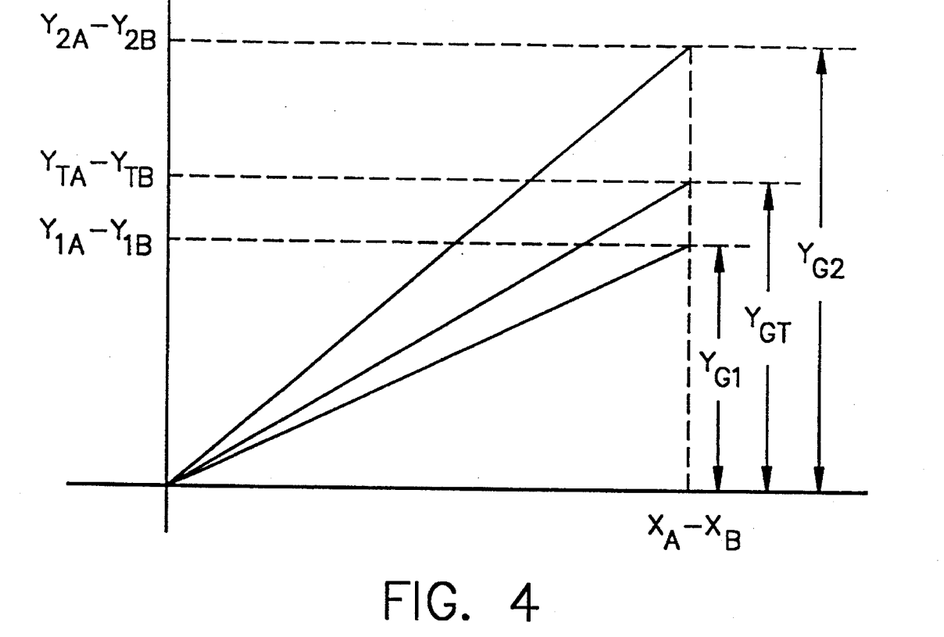
FIG. 4 is a graph showing a normalized system response for the apparatus of FIG. 1 in accordance with the present invention.

FIG. 3 shows three responses Y, where response $Y_1$ and response $Y_2$ are the responses due to some arbitrary digital gain and offset inputs (correction factors) to D/A converters 26 and 28 and response $Y_T$ being the desired (or target) system response for calibrated gain and offset inputs to be determined by this invention. The A and B subscripts represent the specific responses to reference sources $X_B$ and $X_A$ scanned by imager 10. These may be a black reference source $X_B$ (minimum signal) and a white reference source $X_A$ (maximum signal) although other reference source levels may be used in the invention method. FIG. 4 shows the same three responses normalized to eliminate the offset term.

FIG. 4 suggests an approach to determine the required digital gain input in order to achieve the target system response, namely to measure the response at two arbitrary gain correction settings in order to find the effectiveness of changing the gain, and then calculate the target gain. Fix the digital gain input to $D_{G1}$ and take readings at $X_A$ (perhaps the open gate or $D_{min}$ condition corresponding to maximum signal) and $X_B$ (perhaps the dark or $D_{max}$ condition corresponding to minimum signal):

$$Y_{G1A} = (G_L + G_R D_{G1})X_A + (O_L + O_R D_O) + O_{GI} + O_{AD} \quad [8]$$

$$Y_{G1B} = (G_L + G_R D_{G1})X_B + (O_L + O_R D_O) + O_{GI} + O_{AD} \quad [9]$$

The difference between the two readings gives the expression:

$$Y_{G1} = Y_{G1A} - Y_{G1B} = (G_L + G_R D_{G1})(X_A - X_B) \quad [10]$$

Let $X_A = 1$ and $X_B = 0$ representing maximum and minimum ideal signal input, respectively:

$$Y_{G1} = G_L + G_R D_{G1} \quad [11]$$

Similarly, fix the digital gain input to $D_{G2}$ and take readings at $X_A$ and $X_B$:

$$Y_{G2} = G_L + G_R D_{G2} \quad [12]$$

Subtract $Y_{G1}$ from $Y_{G2}$:

$$Y_{G2} - Y_{G1} = (D_{G2} - D_{G1})G_R \quad [13]$$

$$G_R = \frac{Y_{G2} - Y_{G1}}{D_{G2} - D_{G1}} \quad [14]$$

It will be seen from the description below that $G_R$ will be useful in determining the digital gain input $D_{GT}$ required to achieve the desired slope in system response.

The goal of providing gain correction is to make the slope of the system response for all pixels equal to the slope of a desired system response. Referring to FIG. 3, it can be seen that the slope of the desired system response $Y_{GT}$ is simply:

$$\frac{Y_{GTA} - Y_{GTB}}{X_A - X_B} \quad [14a]$$

The idealized reference inputs $X_A$ and $X_B$ are "1" and "0", respectively, so the desired slope is really a desired difference between the system output when scanning reference source $X_A$ and the system output when scanning reference source $X_B$. Call this desired difference $Y_{GT}$. Given this desired difference $Y_{GT}$, the digital gain input $D_{GT}$ required to achieve $Y_{GT}$ may now be determined:

$$Y_{GT} = Y_{GTA} - Y_{GTB} = (G_L + G_R D_{GT})(X_A - X_B) \quad [15]$$

$$Y_{GT} = G_L + G_R D_{GT} \quad [16]$$

Subtract $Y_{G1}$ from $Y_{GT}$:

$$Y_{GT} - Y_{G1} = (D_{GT} - D_{G1})G_R \quad [17]$$

$$D_{GT} = D_{G1} + \frac{Y_{GT} - Y_{G1}}{G_R} \quad [18]$$

Substitute for $G_R$:

$$D_{GT} = D_{G1} + \frac{Y_{GT} - Y_{G1}}{Y_{G2} - Y_{G1}} (D_{G2} - D_{G1}) \quad [19]$$

$$D_{GT} = D_{G1} + \frac{Y_{GT} - (Y_{G1A} - Y_{G1B})}{(Y_{G2A} - Y_{G2B}) - (Y_{G1A} - Y_{G1B})} (D_{G2} - D_{G1}) \quad [20]$$

To simplify the ultimate determination of $D_{GT}$, it is useful to set the value of $D_{G1}$ to 0:

$$D_{GT}|_{D_{G1}=0} = \frac{Y_{GT} - Y_{G1}}{Y_{G2} - Y_{G1}} D_{G2} = \quad [21]$$

$$\frac{Y_{GT} - (Y_{G1A} - Y_{G1B})}{(Y_{G2A} - Y_{G2B}) - (Y_{G1A} - Y_{G1B})} D_{G2}$$

Note that this expression depends solely on selected digital gain inputs and digital A/D converter outputs at those digital gain inputs (correction factors) for two predetermined reference sources $X_A$ and $X_B$. All terms which involve parameters internal to the signal processing circuitry (such as fixed offsets, gain ranges, absolute gain values, etc.) are eliminated, so the desired digital gain value calculated by this expression is independent of these internal details. This makes the calibration process immune to manufacturing or environmental variations which might change the operating point of the internal circuitry from scanner to scanner.

So, to determine the digital gain values required for each light detecting site on the CCD, set the digital offset correction values to some arbitrary values and collect the digital responses from A/D converter 30 for each site under four conditions:

$Y_{G1A}$ the digital response for a site when the ideal input signal is maximum (X=1) and digital gain value is zero ($D_{G1}$=0), $Y_{G1B}$ the digital response for a site when the ideal input signal is minimum (X=0) and digital gain value is zero ($D_{G1}$=0), $Y_{G2A}$ the digital response for a site when the ideal input signal is maximum (X=1) and digital gain value is a non-zero value ($D_{G2}$=N), and $Y_{G2B}$ the digital response for a site when the ideal input signal is minimum (X=0) and digital gain value is the same non-zero value ($D_{G2}$=N).

These responses are stored separately in first through fourth memory means, i.e. storage locations, in the memory of microprocessor 100. For each site, evaluate expression [21] using the four digital responses and the non-zero digital gain value N in order to determine the appropriate digital gain value $D_{GT}$ to use for that site.

Once the target gain correction value is determined for a pixel, it is also desirable to determine the offset correction value for that pixel. To determine digital offset value, fix the normalized input X and the digital gain input $D_G$ to some arbitrary values and take readings at two digital offset inputs $D_{o1}$ and $D_{o2}$:

$$Y_{o1A} = (G_L + G_R D_G)X + (O_L + O_R D_{o1}) + O_{Gf} + O_{AD} \quad [22]$$

$$Y_{o2A} = (G_L + G_R D_G)X + (O_L + O_R D_{o2}) + O_{Gf} + O_{AD} \quad [23]$$

Find the difference between the two readings:

$$Y_{o2} - Y_{o1} = (D_{o2} - D_{o1})O_R \quad [24]$$

Note that there is no dependence in this equation on the idealized input, the pixel-to-pixel gain or offset, or the digital gain in the A/D converter 30. Hence, this could be determined by supplying a test voltage from a test signal generator 12 to the offset correcting circuitry rather than actually involving the idealized input signal. Solving for $O_R$, the relationship between offset and digital offset correction value input gives:

$$O_R = \frac{Y_{o2} - Y_{o1}}{D_{o2} - D_{o1}} \quad [25]$$

Now that this is known, take a reading with the ideal input signal set to minimum (X=0), the digital gain values set to the target values determined for each site by expression [21], and the digital offset correction values set to maximum. For each light detecting site we get:

$$Y_o = (G_L + G_R D_{GT})X + (O_L + O_R D_{o\ max}) + O_{Gf} + O_{AD} \quad [26]$$

Note that the term involving the ideal input signal X goes away because the ideal input signal is zero. Rearranging terms, we get:

$$Y_o - O_R D_{o\ max} = O_L + O_{Gf} + O_{AD} \quad [27]$$

If it is desired to have the digital output be zero when the ideal input is zero, then:

$$0 = O_L + O_R D_{OT} + O_{Gf} + O_{AD} \quad [28]$$

Substituting [27] into [28] yields:

$$0 = Y_o - O_R D_{o\ max} + O_R D_{OT} \quad [29]$$

Solving for the desired digital value and using [25] provides the desired digital offset correction value for each light detecting site expressed in terms of digital offset correction values and A/D output values:

$$D_{OT} = D_{0\ max} - Y_O \frac{D_{o2} - D_{o1}}{Y_{o2} - Y_{o1}} \quad [30]$$

Figure 5:
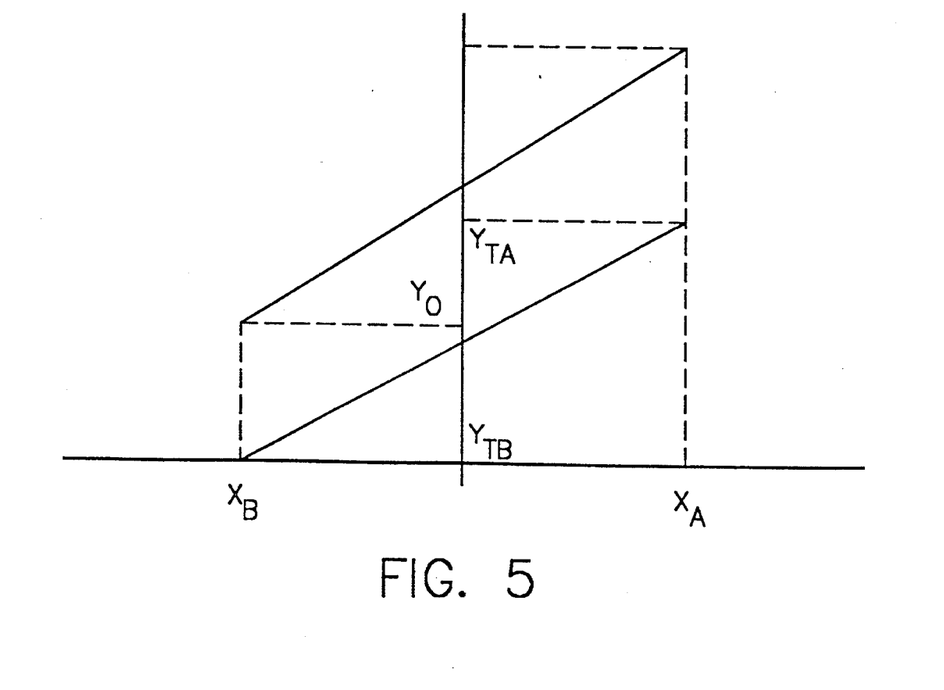
FIG. 5 is a graph showing offset system response correction in accordance with the present invention.

For each imaging pixel, expression [30] is evaluated in order to determine the appropriate digital offset correction value to use to achieve zero digital A/D output for minimum input. Referring to FIG. 5, this is shown graphically as moving the response $Y_O$ down to the zero level $Y_{TB}$.

In a preferred form of the invention, calibration is accomplished by using as reference sources $X_A$ and $X_B$, light source passed through shutter that is fully open for $X_A$ and fully closed for $X_B$. In some situations, the maximum amount of light that the CCD may see during actual scanning operation after calibration may not be the same as the amount of light seen during calibration. If film is being scanned, for example, the maximum amount of light which can be seen is the amount of light permitted through the areas of film which have the lowest density, $D_{min}$. However, it may be desirable to calibrate the scanner with no film present, a so-called open gate condition. If the CCD has an exposure control, this situation may be accommodated by reducing the exposure during the calibration process and then applying some multiplier to this exposure setting in order to come up with an appropriate exposure during actual scanning of film. Assuming that exposure is a factor of m in expression [1], then the calibration approach developed in this disclosure is still valid, since the expressions used to determine digital gain and offset set points for each light detecting site do not depend on value of m. Therefore, the only requirement is that the open gate exposure be multiplied by some factor which will yield the same digital A/D output for minimum density film. Naturally this assumes that the exposure control is completely linear, or sufficiently linear within the range of interest.

For example, in the case of color negative film the minimum transmission densities might be 0.30, 0.60, and 0.90 in the red, green, and blue layers, respectively. When the scanner is reading these films the maximum scanner output would be 0.5 times, 0.25 times, and 0.125 times the open gate readings in red, green, and blue, respectively. If the times that the CCD accumulates charge are increased by a factor of 2 in red, 4 in green, and 8 in blue from the times used to collect data from an open gate, then the scanner output from minimum transmission areas of the film will be the same as the open gate calibration output.

This so-called open gate calibration procedure avoids having to provide a standard "minimum density film" or some simulated minimum density during calibration which must then be removed during actual scanning. In practice, this means there need be only two states for the scanning gate instead of three: open and closed versus open, closed, and minimum density for calibration.

In a preferred embodiment of this feature of the invention for determining exposure duration when performing actual scanning, a first value of exposure duration is set, a light source is scanned in the absence of any image to derive scanner signal samples from each imaging pixel and an average of the samples is calculated. A predetermined average value of scanner signals is established that represents a maximum average scanner signal value to be obtained during actual scanning of an image ($D_{min}$ condition in the case of film scanning) that corresponds to a maximum average scanner signal output (e.g. open gate condition) obtained during calibration without the image being present. The setting of a new exposure duration is then calculated as a function of the first exposure duration value, the calculated average of the samples and the predetermined average value of scanner signals.

A complete actual calibration procedure for a scanner, including establishing the digital gain and offset correction factors, and the exposure multiplier in accordance with the features of the invention described above, is outlined below.

A. Make sure the shutter is closed.
B. Mark CCD imaging pixels as either uncalibrated or skipped (in case some sites are not to be calibrated).
C. Determine effectiveness of the offset controls:
   1. set the gain to middle value
   2. select ⅓ voltage level test signal
   3. get one line of data with digital offset correction value set to middle value
   4. calculate average of data
   5. get one line of data with digital offset correction value set to maximum value
   6. calculate average of data
   7. calculate effectiveness of digital offset correction value, expression [25], based on averages
D. Find the optimum exposure point for the CCD
   1. allow signal in from the CCD
   2. start at mid-range exposure
   3. get one line of data with shutter closed, gain set to middle value, offset set to maximum value
   4. calculate average of data; use this as dark reference
   5. open up the shutter
   6. set high exposure to maximum exposure, low exposure to minimum exposure
   7. calibrate exposure using a binary search
      a. calculate and set trial exposure halfway between high exposure and low exposure
      b. get one line of scan data at trial exposure
      c. calculate average and subtract dark reference
      d. if average is above aim, then set high exposure to halfway between trial exposure and previous high exposure; else if average is below aim, then set low exposure to halfway between trial exposure and previous low exposure; else the optimum exposure point has been determined
      e. if optimum exposure has been reached, or if the maximum number of iterations has been reached, continue; else return to step D.7.a. above and repeat
E. Determine and correct individual pixel gains
   1. set gain value to minimum (digital value to D/A converter of zero)
   2. get multiple lines of scan data with shutter closed
   3. average lines of scan data together to get an averaged line of scan data
   4. get multiple lines of scan data with shutter open
   5. average lines of scan data together to get an averaged line of scan data
   6. set gain value to middle value
   7. for one or more iterations:
      a. get multiple lines of scan data with shutter open
      b. average lines of scan data together to get an averaged line of scan data
      c. get multiple lines of scan data with shutter closed
      d. average lines of scan data together to get an averaged line of scan data
      e. check the results from each imaging pixel to see if the difference between light and dark is close enough to the target value; if so, then mark the imaging pixel as calibrated for gain; if not, then calculate (using expression [21]) and set a new gain value taking into account the measurements made at zero gain in steps E.2. and E.4. above
      f. if all imaging pixels are calibrated for gain, or if the maximum number of iterations has been reached, continue; else return to step E.7.a. above and repeat with the new gains
F. Multiply the open gate exposure time determined in step D by a pre-determined factor which will result in an appropriate exposure time for when film is actually being scanned; set the exposure to this newly calculated value
G. Close the shutter; determine and correct individual pixel offsets
   1. for one or more iterations
      a. get multiple lines of scan data
      b. average lines of scan data together to get an averaged line of scan data
      c. check the results from each imaging pixel to see if the digital output is sufficiently close to zero; if not, then calculate (using expression [30] and the results of part C) and set a new offset value
      d. if all imaging pixels are calibrated for offset, or if the maximum number of iterations has been reached, continue; else return to step G.1.a. above and repeat with the new offsets In summary, there has been disclosed a calibration method for a scanner employing imaging pixel by imaging pixel gain and offset correction which is insensitive to the operating point of the signal processing circuitry. For gain, this method requires taking light and dark measurements at both a high gain and a low gain and then calculating the required numeric input to the gain D/A converter in order to obtain the desired numeric output. Additionally, a method is described for calibrating by taking readings with an open gate (i.e., no film or filters present) and then calculating the required exposure for proper operation when the subject material is to be scanned.

The invention has been described with reference to a preferred embodiment. However, it will be appreciated that variations and modifications can be effected by a person of ordinary skill in the art without departing from the scope of the invention.

What is claimed is:

1. A method for calibrating an image scanner signal processing circuit by determining a scanner signal correction factor required to compensate for nonuniformity among imaging pixels of a scanning array, the method comprising the steps of:

sequentially setting the signal processing circuit at first and second correction factors for all imaging pixels of the scanner array;

sequentially scanning first and second reference sources representing high and low scanner output signal values to derive first and second scanner signal samples from the first and second reference sources, respectively, for the first correction factor and to derive third and fourth scanner signal samples from the first and second reference sources, respectively, for the second correction factor; and applying a target correction factor to the signal processing circuit for each individual imaging pixel determined from (a) a desired difference between samples obtained for the individual imaging pixel by scanning the first and second reference sources, (b) the first correction factor for the individual imaging pixel, (c) the second correction factor for the individual imaging pixel, and (d) the first through fourth signal samples for the given imaging pixel.

2. A method according to claim 1 for determining gain correction required for nonuniformity in imaging pixels of a scanning array which is directed to sampling an image by detecting light transmitted from a light source through an image, wherein the gain correction is determined by scanning the light source in the absence of any image at a first exposure duration, and actual scanning of images takes place at a second exposure duration.

3. The method of claim 2 wherein the second exposure duration is determined by multiplying the first exposure duration by a predetermined value.

4. The method of claim 2 wherein the first exposure duration is determined by:

a. setting an exposure duration to a first value;

b. scanning the light source in the absence of any image and calculating an average of the samples;

c. calculating the setting of a new exposure duration as a function of the first value of exposure duration, the calculated average of the samples, and a predetermined desired average; and d. repeating steps b and c, if needed, until the predetermined desired average is achieved.

5. A method for calibrating an image scanner signal processing circuit to determine scanner signal gain correction required to compensate for nonuniformity among imaging pixels of a scanning array, the method comprising the steps of:

a. setting a first value of scanner signal gain correction for all imaging pixels of the array;

b. scanning a first reference source which represents a maximum scanner signal output to derive individual pixel samples and storing the samples in a first storage means;

c. scanning a second reference source which represents a minimum signal and storing the samples in a second storage means;

d. setting the gains for all elements of the array to second values;

e. scanning a first reference source which represents a maximum signal and storing the samples in a third storage means;

f. scanning a second reference source which represents a minimum signal and storing a samples in a fourth storage means; and g. calculating a gain correction value for each element of the array based on a desired difference between samples obtainable by scanning the first and second reference sources, the first gain value of the given array element, the second gain value for the given array element, and the samples for the given array element from the first, second, third, and fourth storage means.

6. The method in claim 5 wherein the calculation of the gain for each element of the array is:

$$D_{GT} = D_{G1} + \frac{Y_{GT} - (Y_{G1A} - Y_{G1B})}{(Y_{G2A} - Y_{G2B}) - (Y_{G1A} - Y_{G1B})} (D_{G2} - D_{G1})$$

where, for each scanning array element:

$Y_{GT}$ represents the desired difference between samples from the maximum and minimum reference sources, $D_{G1}$ represents the first gain value, $D_{G2}$ represents the second gain value, $Y_{G1A}$ represents the sample from the first storage means, $Y_{GB1}$ represents the sample from the second storage means, $Y_{G2A}$ represents the sample from the third storage means, $Y_{G2B}$ represents the sample from the fourth storage means, and $D_{GT}$ represents the gain correction required.

7. The method of claim 6 wherein the gain determination method is repeated one or more times with one of said gain values set to the gain correction values calculated during the just previous iteration.

8. The method of claim 5 wherein the gain determination method is repeated one or more times with one of said gain values set to the gain correction values calculated during the just previous iteration.

9. A method for determining offset correction of a scanner array signal processing circuit required to compensate for nonuniformity in imaging pixels of the scanning array, wherein the offset correction is determined by:

a. setting the input offsets for all pixels of the array to a first offset value;

b. measuring a first reference source to derive first samples on a pixel-by pixel basis and calculating a first average of the first samples;

c. setting the input offsets for all pixels of the array to a second offset value;

d. measuring the first reference source again to get second samples and calculating a second average of the second samples;

e. calculating the effectiveness of offset control of the the signal processing circuit by dividing a difference between the first and second sample averages by a difference between the first and second offset values;

f. setting input offset correction for all pixels of the array to third values;

g. scanning a second reference source to get third samples which represent a predetermined signal level and storing the third samples in a storage means;

h. calculating a digital offset correction value for each pixel of the scanning array based on a desired sample obtainable by scanning the second reference source, the third offset value for the given array pixel, the third sample from the storage means, and the calculated effectiveness of the offset control.

10. The method of claim 9 wherein steps f, g, and h are repeated one or more times with third offset values set to the offset correction values calculated during the just previous iteration.

11. The method of claim 9 wherein the first reference source is a test voltage generated independently of the scanning array.

* * * * *